Feb. 21, 1967 M. A. RAMSEY 3,304,697
OIL SEPARATOR
Filed May 21, 1964
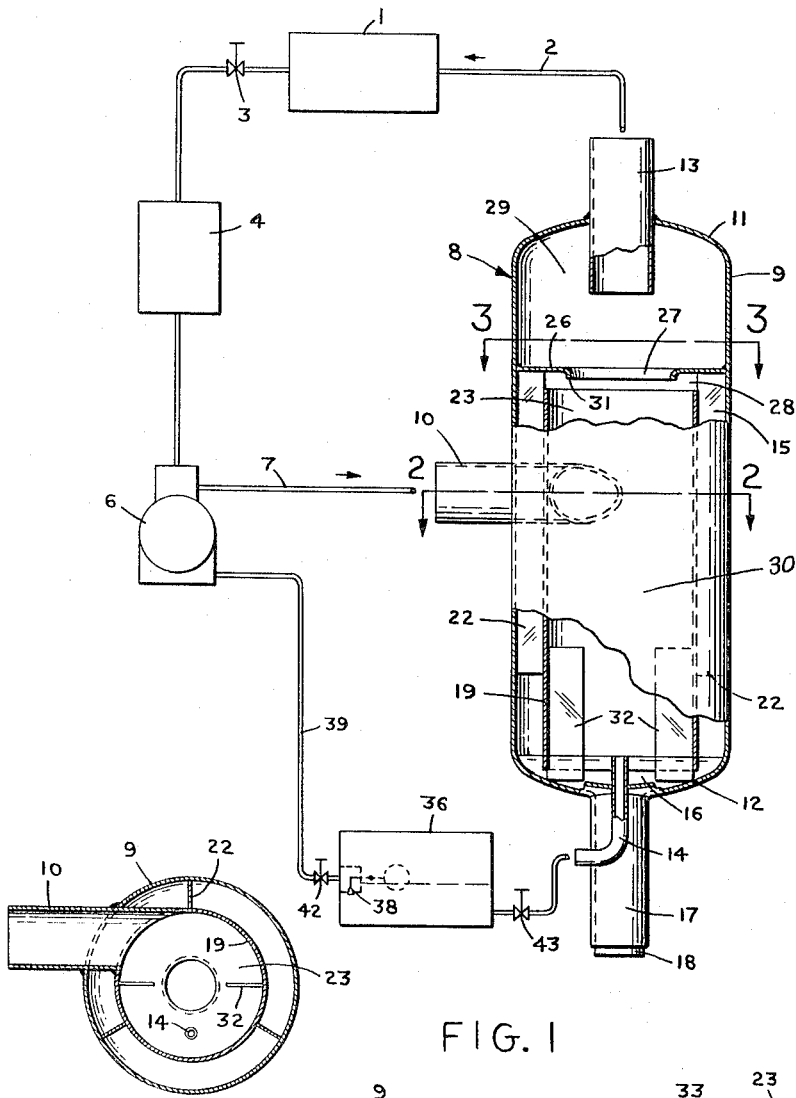
FIG. 1
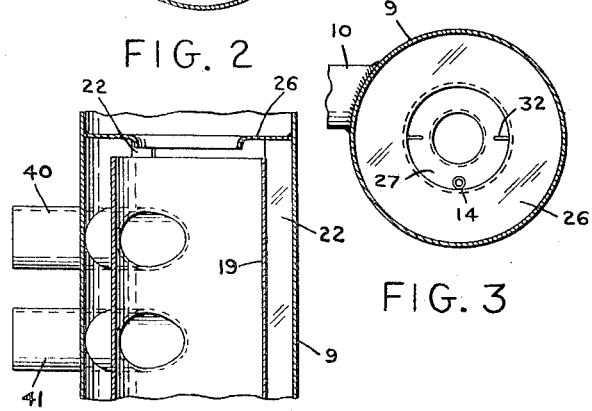
FIG. 2
FIG. 3
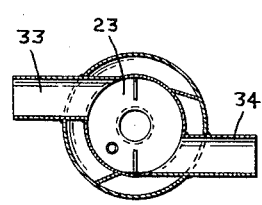
FIG. 4
FIG. 5
MELVIN A. RAMSEY
INVENTOR.
BY Daniel H. Bobis
Atty

United States Patent Office 3,304,697
Patented Feb. 21, 1967

3,304,697
OIL SEPARATOR
Melvin A. Ramsey, Glen Ridge, N.J., assignor to Worthington Corporation, Harrison, N.J., a corporation of Delaware
Filed May 21, 1964, Ser. No. 369,073
1 Claim. (Cl. 55—459)

This invention relates to a mechanical device for separating a composite fluid stream into gaseous and non-gaseous components. It relates particularly to a separator for removing oil or other liquid in mist or fog from a gaseous carrier stream.

Centrifugal type oil or other fluid separators function on the principle of centrifuging a composite gas stream including a carrier gas such that the heavier component of the stream will be thrown outwardly and exert a greater force than the gaseous component. The prior art has shown that such an arrangement functions successfully in that the heavier liquid will become deposited on a wall or other plane surface and thereafter be urged by the gaseous stream into a reservoir or sump.

What the present invention provides is a simple, efficient, separating means interposed in a fluid circuating system or cycle, to receive a high velocity liquid carrying gaseous stream to effect separation of said stream into gaseous and non-gaseous components. The novel structure embodies a plurality of chambers so interconnected and arranged to separately receive the respective components and for re-directing the latter back into the system to be again circulated.

It is therefore an object of the invention to provide a separator for gaseous streams carrying a liquid or solid component.

A further object of the invention is to provide a novel separator utilizing centrifugal force of the incoming stream to be separated whereby the non-gaseous portion of the stream is efficiently removed therefrom into a collecting means.

A still further object of the invention is to provide a novel oil separator of the type described having separate chambers from accumulating a non-vaporous medium being carried on a high velocity gaseous stream, and liquid sealing means cooperative with the separator forming a vapor tight partition between adjacent collecting chambers.

Still another object of the invention is to provide novel means to retain oil or other liquid medium within the separating chamber and passing a substantially liquid-free stream of gas from the chamber.

Still another object of the invention is to provide a relatively simple structure for use in a refrigeration system utilizing a high pressure refrigerant gas, said structure functioning to efficiently separate refrigerant from oil which has been picked up in the compression portion of the system, whereby said oil may be recirculated to the system compressor.

FIGURE 1 is a schematic arrangement of a refrigeration system illustrating on an enlarged scale, and in partial cross section, a fluid separator of the type contemplated.

FIGURE 2 is a cross sectional view taken along line 2—2 in FIGURE 1.

FIGURE 3 is a cross sectional view taken along line 3—3 in FIGURE 1.

FIGURE 4 is a top view taken in cross section, of an alternate embodiment of the novel separator and FIGURE 5 is a segmentary side elevation view in partial cross section, showing still another embodiment of the separator.

In its broadest terms, the disclosed invention provides an oil separator, cooperatively connected into a refrigeration system having one circuit circulating lubricating oil from the separator back to the system compressor, a second circuit directs oil-free refrigerant from the separator into the system condenser to be thereafter expanded and circulated to the system evaporator.

Referring to FIGURE 1, a system of the type presently contemplated is shown in which the novel oil separator is a component. The system includes in general a condenser 1 having an inlet connected to a line 2 carrying oil-free refrigerant therethrough.

At the condenser downstream side, refrigerant liquid may pass through a receiver means not shown, or may pass directly through an expansion valve 3 to the inlet side of the evaporator 4. Evaporated refrigerant vapor is thereafter passed to the suction inlet of compressor 6 to be compressed and discharged through line 7 as a hot, compressed, vaporous gas containing a percentage of gas-borne oil particles accumulated from the compressor crank case.

A separator 8 is disposed in the closed refrigeration system and includes an inlet 10, connected to line 7 and receiving the high pressure flow of compressed refrigerant therefrom. This gas velocity at the downstream side of compressor 6 may be of a magnitude of approximately 5,000 ft./min. depending on the capacity of the system and the size of the compressor.

The refrigerant medium normally circulated in a system of the type shown, may include any number of materials such as refrigerants commercially designated as 717, 12, 13, 22 or mixtures thereof. Although these refrigerant media are found to possess varying characteristics under different operating conditions, they nevertheless function in such manner as to be operable with the present separator to remove liquid from the refrigerant gas.

Under many operating conditions, oil passing through a refrigerant circuit is not considered harmful to the system since the lubricant moves through the circuit with the refrigerant. However, there are a considerable number of cases where separation takes place, and the oil does not return to the compressor where it is required for lubrication. The separated oil may become very viscous, even waxlike, at low temperature. These conditions are well known to those familiar with the refrigeration art. It has therefore been common practice to install an effective separator, in the circuit, consistent with a reasonable cost and pressure loss. The excellent separating characteristics of the presently disclosed device, plus the simplicity of construction and low flow resistances make it particularly fit the rigid requirements of an effective separator.

Compressors utilized in the described refrigeration system may be of a variety of types including reciprocating and rotary.

It is understood, that while the novel separator device is shown as embodied in a particular refrigeration system, it is understood by those skilled in the art that the present disposition and arrangement of the oil separator is readily adapted to function with a number of systems employing a gas stream carrying liquid. It should be noted, however, that although the system separator is found to function satisfactorily to a certain degree in the instance of solid particles being carried on a vaporous stream, separation of such a stream presents problems not encountered in the instance of the separation of a liquid such as oil or the like.

When a possibility exists that liquid refrigerant or objectionable solid particles leaving evaporator 4 might enter compressor 6, the present separator may alternatively be installed such that gas from the evaporator enters inlet 10, and outlet 13 communicates with the compressor inlet. In this instance, liquid drain from 14 wouldn't normally pass through a float valve as indicated but, rather use an alternative restriction or heating means to assure that liquid refrigerant is evaporated from the oil before being returned to the compressor.

If desired, the separator might be adapted to accumulate refrigerant liquid and include a heating means placed in the lower part of this vessel to promote evaporation. Such heating means includes a coil through which relatively warm refrigerant liquid passes, or any other appropriate heating means.

Referring to FIGURE 1, the liquid separating device generally shown at 8 includes an elongated shell 9 having preferably a cylindrical configuration and disposed in an upright position. The upper end of shell 9 includes upper end plate 11 fastened to the shell at a perihperal weld or seal. The lower end of shell 9 is closed by a similar end plate 12 thereby defining a substantially vapor tight enclosure within the separator. A discharge conduit 13 is sealably fixed in upper end plate 11 providing a passage from the inner portion of the separator for liquid-free refrigerant gas being directed therethrough.

While the following description of the invention generally refers to the separator as comprising cooperating metallics parts, it is understood that the normal function achieved by the device and the use thereof is not so confined since cooperating elements may be similarly made up of plastic or other non-metallic material so formed and assembled to provide the desired internal arrangement.

Shell 9 includes a single inlet means 10 communicated with line 7 at the compressor downstream side. Inlet 10 as shown in FIGURES 1, 2 and 3 extends through the outer wall of shell 9 to the central chamber in a manner to be hereinafter described.

Overflow means 14 passing through a wall of plate and disposed in the lower part thereof, extends upwardly from the lower surface of the shell 9 thereby maintaining a predetermined height of lubricant oil in the shell sump 16. A clean out pipe 17 also disposed in the lower part of the shell 9 includes a removable plug 18 which may be disconnected from pipe 17 for the purpose of draining oil and other material from the lower part of the sump 16. This cleanout means is not essential for refrigerating system applications, but is helpful in removing objectionable material from the circuit, particularly during the initial operating period, by collecting such material where it can be easily removed.

An elongated casing or baffle 19 includes a cylindrical member having opposed open ends, and disposed substantially concentrically in shell 9. Casing 19 is of a smaller diameter than inner shell 9, thereby defining an annular chamber 15 intermediate adjacent side walls of the baffle and shell. Casing 19 is cetnrally positioned within shell 9 by a plurality of longitudinally extending support members 22 as shown in FIGURE 2, which may be circumferentially spaced to provide the necessary rigidity to the casing member. Support means 22 may be fastened to either or both the casing and the shell and extend slightly forward of the casing upper end.

Support members 22 not only position the casing 19, but also provide baffle means as will be hereinafter shown for slowing the rotating motion of oil, or other liquid which enters the annular chamber 15 from the center vortex chamber 23. Until the rotating motion is sufficiently reduced, the liquid will not collect and drain from the annular chamber 15.

As shown in FIGURE 2, vortex chamber 23 defined by casing 19, is generally circular in cross section and connects to inlet 10 which extends through the shell 9 and welded thereto at a peripheral joint and tangentially intersects casing 19, providing means for introducing a high velocity stream of liquid carrying gas into the vortex chamber 23.

As shown in FIGURE 2, inlet tube 10 is sufficiently large in diameter to accommodate the maximum expected flow from the compressor 6. However, it has been found that a preferred ratio between the diameter of inlet 10 and the diameter of the vortex chamber 23 is approximately ⅓ to ⅕. This proportion is found to induce the necessary high rate of velocity to the swirling gas in the vortex chamber 23, thereby promoting separation of the oil from the gas. As the diameter of the vortex chamber is increased, the effectiveness of the swirling action induced by said chamber is decreased proportionately.

As shown in FIGURE 1, the casing 19 is generally of a cylindrical configuration. It has been found, however, that the essential function performed in chamber 23, is that of inducing oil carrying vapors into a rapidly swirling mass, may be effected by a vortex chamber wall having a slight taper as would be provided by a conical member. In the latter instance, however, the degree of separation of solid and vapor is subjected to an added variation since the taper of the vortex chamber wall whether, it be converging or diverging with respect to the gaseous flow, will vary the degree of the oil separation achieved.

A panel 26 is disposed transversely of the shell 9 substantially perpendicular to the central axis of the shell 9 and casing 19. Panel 26 as shown is positioned in abutting relationship with the upright support members 22, and may be fastened to the latter as well as the inner wall of shell 9. It is operationally desirable that panel 26 form a reasonably gas tight fit with casing 9. Means forming a center opening 27 in panel 26 is positioned coaxially of the vortex chamber 23 having a diameter slightly less than the diameter of the circular lip 31 of the casing 19 defining the upper end of the vortex chamber 23. Thus may be seen whereby the panel 26 functions to divide the interior of the shell into what may be termed first and second or upper and lower compartments 29 and 30, respectively.

Passage means 28 is defined intermediate the lower face of panel 26 and the upper edge of casing 19. Said passage 28 may be as shown, of annular configuration, and is formed radially outward of the center opening 27 in panel 26. Passage 28 provides communication between vortex chamber 23 and the outerwardly disposed collection chamber 15. Thus, oil or other liquid being urged upward by the gas flow toward outlet 13 is provided with a lateral opening 28 into which the non-gaseous component will pass due to centrifugal force. Liquid thus separates from the gas stream and enters annular chamber 15, in which there is no gas flow to interfere with gravity flow of liquid toward the lower or drain end of the vessel.

Test data accumulated with a separator of the present design but with an arrangement for separately collecting oil which drained into sump 16 and that which was carried upwardly through passage 28, into chamber 15 indicated that the rate of recovery from chamber 15 was five times the rate which drained into the sump. The actual proportions of oil received will of course vary with different operating conditions but it is evident, from a knowledge of the principles involved, that the proportion of oil leaving the upper edge of chamber 23 and passing into annular chamber 15, will be greater as the gas velocity increases. Thus the novel arrangement makes it possible to reduce the size of the separator while still maintaining effective separation.

As shown in FIGURE 1, opening 27 in panel 26 is provided with an inwardly protruding lip 31 which functions to urge liquid oil particles toward passage 28 and chamber 15. The upper ends of support member 22 are shown in FIGURES 2 and 4 as being disposed substantially radially of the annular passage 15. The upper ends of said support members, as well as the entire member however, may be biased or formed with a curved upper surface. Thus, members 22 function to deter and guide oil flow, while simultaneously deflecting the gas flow to maintain the static in atmosphere chamber 15.

Vortex chamber 23 as previously described includes preferably a cylindrical member having substantially smooth inner walls to prompt the rapid uninterrupted swirling motion of the liquid bearing gas stream. The lower end of vortex chamber 23 terminates in sump 16 disposed in the lower part of shell 9. Thus, as the swirling, oil carrying gas stream deposits oil onto walls of the vortex chamber, said oil will tend to either fall under gravity and accumulate in sump 16, or alternatively by driven upward by the rapidly spiralling gas.

In the instance of oil flowing downwardly through the vortex chamber 23 the lower part of said chamber is provided with a plurality of deflectors 32 extending radially inward from the wall of shell 19 to interrupt the swirling action of the gas in that portion of the chamber adjacent the deflectors. Thus, the lower part of the vortex chamber defines an area having a relatively static atmosphere as contrasted with gas movement through the upper vortex chamber. Deflectors 32 include metallic members protruding upwardly and radially inwardly of the vortex chamber 23, extending generally longitudinally thereof.

As shown in FIGURE 4, an alternative embodiment of the invention includes a construction having a plurality of gas inlet means communicating with the central vortex chamber 23. These inlet means 33 and 34 are shown spaced approximately 180° apart although the particular angle does not constitute a limitation to the invention or the basic operating principles thereof.

Alternatively, other suitable arrangements of gas inlet means as might be adopted for example four support members can be disposed with 90° therebetween, or three members with 120° between. The arrangement need not be symmetrical to achieve the desired deflecting action. A further variation of a suitable arrangement disposes two or more gas inlet means, one above the other, as shown by inlet means 40 and 41 in FIGURE 5.

A still further alternative on inlet arrangement connecting with the vortex chamber resides in the combination shown in FIGURE 4 and FIGURE 5 with gas inlet means spaced at various positions along the separator axis and also at different angular positions. The only essential requirement of the gas inlet means is that said members enter the vortex chamber as to cause uniform rotation of the gas and other material in the same direction.

With multiple inlet means arrangements, outlet 13 is preferably of a size having a cross sectional area approximately the same as, or greater than the sum of the cross sections of the various gas inlet means.

At the lower end of shell 19 in sump 16, a small reservoir of lubricant oil is maintained at all times by overflow 14 positioned with an inlet thereof above the lower surface of the shell 19. The principal function of this reservoir is to form an oil seal between the adjacently positioned vortex chamber 23 and the outward collecting chamber 15. Thus, at the lower face of casing 19 an annular passage defined by said casing and the adjacent or lower end plate 12 is substantially immersed in the oil reservoir to maintain a liquid seal.

Referring to FIGURE 1, in the instance of a refrigeration system in which the present separator is employed in the compressor discharge line 7 to separate oil from the gas and return it to the compressor, drain 14 connects to a float trap 36 containing a float valve 38. Float valve 38, functions to preclude flow into line 39 when the oil level in trap 36 does not exceed the valve 38 inlet. By this control means, back flow of compressor gas into line 39 is avoided. Under certain operating conditions a vent line not shown connecting the vapor holding portion of trap 36, to the chamber 29 of the separator may be desirable or necessary.

The normal refrigeration circuit arrangement embodying oil separators found in the prior art, has been to incorporate a float valve corresponding to valve 38, in the separator shell to control all the flow through line 14. Such an arrangement can be incorporated with the separator described here. However, the arrangement presently shown is preferred since the float valve is readily accessible for service. For example with hand valves in line 14 and 39 as indicated by 42 and 43 isolation of the float trap 36 for removal or repair of components is a relatively simple operation.

From the foregoing description it is seen that the present liquid separator for gaseous streams although simple in construction, is found to be highly efficient, and inexpensive to fabricate. One operating advantage realized by the presence of the instant separator in a refrigeration system is that there is maintained a minimum pressure drop between compressor discharge, and the condenser intake as the non-compressed refrigerant gas is passed through the separator.

Structurally, the shell 9 and casing 19 are preferably formed of cylindrical members to provide inherent strength particularly to the casing which guides the rapidly swirling, heated gas stream. A further advantage resulting from the configuration presently shown is the simplicity for positioning the hot gas inlet members through the outer shell 9 and at the casing 19 for delivering.

What is claimed is:

In a centrifugal separator for separating the gaseous and non-gaseous components of a composite fluid stream, generally upstanding shell means of generally cylindrical configuration having fluid-tight end cap means sealing the lower extremity thereof to form a sump for the collection of said non-gaseous components therein, dividing means extending generally transversely across said shell means and fluid-tight with respect thereto for dividing the latter into upper and lower compartments, generally upstanding baffle means of generally cylindrical configuration disposed within the shell means in generally concentric relationship relative thereto to form first and second chambers therein, with said first chamber defining a vortex chamber and said second chamber defining a non-gaseous component collection chamber, inlet means communicating with said vortex chamber for introducing a high velocity flow of said composite fluid stream thereto to form a rapidly swirling stream thereof in said vortex chamber for flow through the latter toward said dividing means, the upper extremity of said baffle means being disposed below and spaced from said dividing means to form a first passage communicating said vortex chamber and said second chamber for receiving non-gaseous components from said rapidly swirling stream, the lower extremity of said baffle means being spaced from said end cap means to form a second passage between the said vortex chamber and said second chamber for receiving non-gaseous components from said second chamber, deflector means disposed in the radially outer region of the lower portion of said vortex chamber for deflecting said rapidly swirling stream and providing a generally static atmosphere in said lower portion, spacer means extending between said shell means and baffle means through at least part of said collection chamber for deflecting swirling gases and providing a generally static atmosphere therein, means for maintaining a level of said non-gaseous components in said sump means above said lower extremity of said baffle means to substantially fill said second passage and thus substantially prevent the flow of said gaseous components from said vortex chamber to said non-gaseous components collection chamber through said second passage, outlet means communicating with said sump means to enable the flow of the thusly collected non-gaseous components from said sump means, and at least one opening in said dividing means communicating said first compartment and said first chamber for receiving gaseous components from said rapidly swirling composite fluid stream.

(References on following page)

References Cited by the Examiner
UNITED STATES PATENTS

| | | | |
|---|---|---|---|
| 482,354 | 9/1892 | Goubert | 55—424 |
| 1,715,549 | 6/1929 | Hawley. | |
| 2,002,033 | 5/1935 | Kopsa | 62—470 |
| 2,010,231 | 8/1935 | Heist | 55—459 |
| 2,289,329 | 7/1942 | Prickett | 55—459 |
| 2,414,641 | 1/1947 | French | 55—459 |
| 2,608,269 | 8/1952 | Briggs | 62—470 X |
| 3,204,772 | 9/1965 | Ruxton | 55—459 |

FOREIGN PATENTS

| | | |
|---|---|---|
| 371,351 | 3/1923 | Germany. |
| 17,568 | 1915 | Great Britain. |

References Cited by the Applicant
UNITED STATES PATENTS

| | | |
|---|---|---|
| 1,710,178 | 4/1929 | McMurray. |
| 1,838,507 | 12/1931 | Walker. |
| 2,592,530 | 4/1952 | Artsay. |
| 2,884,092 | 4/1959 | Reindl. |
| 2,954,096 | 9/1960 | McMullen. |
| 2,960,184 | 11/1960 | Deitlhauser. |

HARRY B. THORNTON, *Primary Examiner.*

ROBERT A. O'LEARY, *Examiner.*

W. E. WAYNER, B. NOZICK, *Assistant Examiners.*